(12) United States Patent
Gehwolf et al.

(10) Patent No.: US 9,254,460 B2
(45) Date of Patent: *Feb. 9, 2016

(54) FILTER ELEMENT AND PROCESS FOR PRODUCING A FILTER ELEMENT

(71) Applicant: MANN+HUMMEL GMBH, Ludwigsburg (DE)

(72) Inventors: Klaus Gehwolf, Mamming (DE); Tanja Majer, Ingersheim (DE); Gelase Mbadinga-Mouanda, Karlsruhe (DE)

(73) Assignee: MANN+HUMMEL GMBH, Ludwigsburg (DE)

(*) Notice: Subject to any disclaimer, the term of this patent is extended or adjusted under 35 U.S.C. 154(b) by 106 days.

This patent is subject to a terminal disclaimer.

(21) Appl. No.: 13/751,775

(22) Filed: Jan. 28, 2013

(65) Prior Publication Data
US 2013/0133517 A1  May 30, 2013

Related U.S. Application Data

(63) Continuation of application No. PCT/EP2011/062781, filed on Jul. 26, 2011.

(30) Foreign Application Priority Data

Jul. 26, 2010 (DE) .......................... 10 2010 032 295

(51) Int. Cl.
| | |
|---|---|
| *B01D 46/52* | (2006.01) |
| *B01D 46/00* | (2006.01) |
| *C09J 167/02* | (2006.01) |
| *C09J 177/00* | (2006.01) |
| *B01D 29/01* | (2006.01) |
| *C08L 77/00* | (2006.01) |

(52) U.S. Cl.
CPC ............ *B01D 46/523* (2013.01); *B01D 29/016* (2013.01); *B01D 46/0001* (2013.01); *B01D 46/521* (2013.01); *B01D 46/528* (2013.01); *C09J 167/02* (2013.01); *C09J 177/00* (2013.01); *B01D 2201/40* (2013.01); *B01D 2265/04* (2013.01); *C08L 77/00* (2013.01)

(58) Field of Classification Search
CPC ........................... B01D 46/521; B01D 46/523
USPC ......................................................... 55/521
See application file for complete search history.

(56) References Cited

U.S. PATENT DOCUMENTS

| | | | |
|---|---|---|---|
| 4,217,435 A | | 8/1980 | McConnell et al. |
| 4,363,853 A | * | 12/1982 | Imamura et al. ............... 428/480 |
| 4,891,264 A | | 1/1990 | Daimon et al. |
| 5,071,555 A | | 12/1991 | Enbom |
| 5,236,480 A | * | 8/1993 | Svensson et al. ............. 55/385.2 |
| 5,902,843 A | * | 5/1999 | Simon et al. ................... 523/453 |
| 6,555,218 B2 | * | 4/2003 | Halloran et al. ......... 428/355 EN |

(Continued)

FOREIGN PATENT DOCUMENTS

| | | |
|---|---|---|
| DE | 1299230 B | 7/1969 |
| DE | 10015951 A1 | 12/1999 |

(Continued)

*Primary Examiner* — Robert Clemente
(74) *Attorney, Agent, or Firm* — James Hasselbeck (57) ABSTRACT

The invention relates to a hotmelt adhesive comprising a hotmelt adhesive mixture, the mixture including a) 15-85% by weight of a first, polyester-based hotmelt adhesive and b) 15-85% by weight of a second, polyamide-based hotmelt adhesive.

10 Claims, 4 Drawing Sheets

(56) References Cited

U.S. PATENT DOCUMENTS

| | | |
|---|---|---|
| 8,328,022 B2 * | 12/2012 | Mbadinga-Mouanda et al. ............ 210/493.1 |
| 8,883,933 B2 * | 11/2014 | Gehwolf et al. ............ 525/425 |
| 2008/0132625 A1 | 6/2008 | Niehaus |
| 2010/0168260 A1 | 7/2010 | Frenzel et al. |
| 2011/0054074 A1 | 3/2011 | Jonschker et al. |
| 2013/0042589 A1 * | 2/2013 | Chanak et al. ............ 55/521 |

FOREIGN PATENT DOCUMENTS

| | | |
|---|---|---|
| DE | 10015951 A1 * | 7/2001 |
| DE | 10113077 A1 | 4/2002 |
| WO | WO9935189 A2 | 7/1999 |

* cited by examiner

FILTER ELEMENT AND PROCESS FOR PRODUCING A FILTER ELEMENT

CROSS REFERENCE TO RELATED APPLICATIONS

This application is US Bypass Continuation of international patent application no. PCT/EP2011/062781, filed Jul. 26, 2011 designating the United States of America, the entire disclosure of which is incorporated herein by reference. Priority is claimed based on German patent application no. 10 2010 032 295.4, filed Jul. 26, 2010.

TECHNICAL FIELD

The invention concerns a filter element and a process for its manufacture.

PRIOR ART

DE 1299230 discloses a filter whose folds are connected by means of individual hotmelt adhesive dots.

Such filter elements have the problem that upon application of the hotmelt adhesives, in particular in case of a bead-shaped application with elongate hotmelt adhesive beads interrupted several times or in case of a dot-shaped application, for example, by means of applicator nozzles, applicator rollers etc., hotmelt adhesive strings are formed between the application equipment and the ends of the hotmelt adhesive bead; they cool down and harden and remain in the application area on the filter. This can be disadvantageous in particular in case of an adhesive connection on the clean side of the filter elements because in operation pieces of cold hotmelt adhesive strings may detach and may be entrained by the fluid flow. This can be disadvantageous in particular in case of filtration of intake air of internal combustion engines.

For adhesively connecting the zigzag-folded filter elements, usually hotmelt adhesives are employed. Non-reactive hotmelt adhesives are products that are solvent-free and are more or less hard at room temperature and in the hot state can be applied onto a surfaces to be glued and upon cooling produce the adhesive connection. This group of adhesives is also known as hotmelt and is based on different chemical raw materials. DIN EN 923 defines hotmelt adhesive as a thermally meltable adhesive system that after cooling develops cohesion. Melting points are mostly between 80 degrees Celsius and 250 degrees Celsius. In the prior art various non-reactive hotmelt adhesives on the basis of polyesters or polyamides are known, for example, Macromelt 2030, 6208 from Henkel, WEVO T570, P 165 from WEVO Chemie, or TH 207, TH 111 from Bostik. Müller and Rath, Formulierung von Kleb- and Dichtstoffen, Hannover: Vincentz Network, 2004, disclose further hotmelt adhesives. Upon application of hotmelt adhesives, in particular when interrupting the application done by means of applicator nozzles, adhesive strings are usually formed that are produced between the applied adhesive and an applicator nozzle and that possibly may tear off (stringing).

The invention has the object to provide a filter element, that is glued by a hotmelt adhesive applied in regularly or irregularly interrupted bead shape, with a minimal quantity of hotmelt adhesive strings and a method for its manufacture.

SUMMARY OF THE INVENTION

The object is solved by a filter element, in particular for filtration of gases and liquids, in particular for the filtration of intake air or fuel or oil of internal combustion engines or for filtration of processing liquids of metalworking machines, in particular eroding machines, comprising a zigzag-folded filter bellows formed of a flat filter medium. The filter bellows can be embodied as a rectangular zigzag-shaped filter bellows or as an annularly arranged star-shaped folded filter bellows. Alternatively, a filter medium that forms alternatingly closed passages can be used wherein the filter bellows is produced by winding and glueing together a semi-finished product that comprises two filter medium layers and comprises a flat layer and a corrugated layer positioned thereon.

The filter element according to the invention is glued together by at least one, in particular at least two, in regularly or irregularly interrupted adhesive beads of a hotmelt adhesive system. The adhesive beads extend in particular perpendicularly to the fold edges on the filter medium but can also be arranged at an angle to the fold edges. In analogy, in the filter element that is formed of a flat layer and a corrugated layer, at least one, in particular at least two, regularly or irregularly interrupted adhesive beads of a hotmelt adhesive system are arranged between the flat layer and the corrugated layer of the semi-finished product and/or between the flat and corrugated layers that come into contact with each other upon winding. According to the invention, the hotmelt adhesive system comprises a hotmelt adhesive mixture, the hotmelt adhesive mixture comprising 15-85% by weight, in particular 30-70% by weight, of a first hotmelt adhesive that is polyester-based, and 15-85% by weight, in particular 30-70% by weight, of a second hotmelt adhesive that is polyamide-based solved. According to the invention, the weight proportions of the first and the second hotmelt adhesives preferably together are 100% by weight of the hotmelt adhesive mixture.

In this connection, the hotmelt adhesive mixture constitutes a proportion of 75-100% by weight (preferably nearly or precisely 100% by weight) of the hotmelt adhesive system wherein the remainder is comprised of fillers such as chalk and/or pigments, such as titanium dioxide as a white pigment, and/or a tack-providing resin and/or at least one further hotmelt adhesive based on polycondensate.

As filter media, for example, cellulose media, media of melt-blown fibers, fiber nonwovens or combinations thereof constructed in layers can be used.

It has been found surprisingly that, when using the aforementioned hotmelt adhesive system, a filter element that is glued together by means of interrupted hotmelt adhesive beads can be produced which, in comparison to other such filter elements, exhibits a significantly reduced number of hotmelt adhesive strings.

In one embodiment, the filter element comprises a zigzag-folded filter medium which separates a raw side from a clean side and has alternating fold tips and fold bottoms, wherein in the interstices of the folds in particular elongate adhesive beads are arranged which extend alternatingly between fold tips and fold bottoms, wherein on the raw side, and preferably also in particular on the clean side, of the filter medium at least two adhesive beads, respectively, are arranged on the filter element parallel to each other and perpendicular to the direction of the fold edges, wherein the adhesive beads on the raw side and/or the clean side are interrupted in regular intervals.

Hotmelt adhesive beads are understood as being elongate when the length in the application direction is 5 times longer, preferably 10 times longer, than their width.

In one embodiment, the hotmelt adhesive beads in particular comprise regularly spaced hotmelt adhesive dots that are applied in a dot shape.

In one embodiment, the hotmelt adhesive beads comprise elongate continuously applied sections that can be interrupted, particularly regularly, by interruptions.

In one embodiment, the beginning and end points of the interruptions of the adhesive beads are aligned along a plurality of straight lines which extend parallel to each other and, relative to the fold edges, are positioned at an angle of 10-80 degrees, preferably 45+/−15 degrees.

In one embodiment, the adhesive beads have at the clean side and/or at the raw side an interruption of the adhesive bead which surrounds the fold edge at the clean side or the raw side.

In one embodiment, the adhesive beads at the clean side and/or the raw side have an interruption of the adhesive bead which surrounds the fold bottom at the clean side or the raw side.

In one embodiment, at least one, preferably all, adhesive beads on the raw side are directly positioned opposite one/the adhesive bead(s) on the clean side.

In one embodiment, the interruptions of the adhesive beads on the raw side and the clean side that are positioned opposite each other do not overlap.

In one embodiment, the beginning and end points of the interruptions of the adhesive beads extend along at least two sets of straight lines, wherein each set of straight lines comprises straight lines parallel to each other, wherein the corresponding straight lines on the filter medium intercept each other so that an arrow-shaped or zigzag-shaped course of the interruptions of the adhesive bead on the filter medium is formed.

In one embodiment, the beginning and end points of the interruptions of the adhesive beads are defined by sets of curved lines instead of sets of straight lines wherein the curved lines in particular have the same shape but are displaced relative to each other in a direction perpendicular (+/−30 degrees) to the fold edges.

In one embodiment, the set of curved lines comprises circle sections or ellipsis sections, sine shapes or other regular wave forms.

In one embodiment, the spacing between two sequential interruptions, i.e., the length of a continuous adhesive bead section, is longer than at least one, preferably both, of the interruptions that adjoin the continuous adhesive bead section.

In one embodiment, the length of at least one interruption, in particular of interruptions positioned between fold tip and fold bottom, is 5-20 mm, preferably 20-40 mm, alternatively, 40-60 mm.

In one embodiment, the length of continuous adhesive bead sections is at least 5-20 mm, preferably 20-40 mm, alternatively greater than 40 mm.

Advantageously, the dimensions of the interruptions and of the continuous adhesive bead sections are selected such that a satisfactory stability of the filter medium is achieved and, at the same time, communication between the fold sections that are separated by the adhesive beads is advantageously enabled.

In one embodiment, the filter element comprises a zigzag-folded filter bellows that has two end faces arranged perpendicularly to the fold edges and are closed off seal-tightly by means of glued or fused end disks, by a potting compound (in particular foamed polyurethane) or by a continuous hotmelt adhesive bead, wherein the filter element in the area between the end faces is glued together by at least one, in particular at least two, in particular regularly or irregularly interrupted adhesive beads of a hotmelt adhesive system.

The filter element in one embodiment is embodied as an annular filter element with an annular end disks, wherein one of the end disks is preferably embodied of a closed configuration and the second end disk has an inner fluid flow opening about which an axial or radial seal is arranged for sealing relative to a fluid passage of a housing, in particular the outlet passage for a flow in radial direction from the exterior to the interior.

In another embodiment, the filter element has a rectangular shape with an inflow side at the raw side and an outflow side at the clean side. The filter element is formed by a filter medium folded multiple times wherein the folds extend between the inflow side and the outflow side, i.e., folds tips are present at the inflow side and the outflow side. Lateral surfaces of the filter element that are not flowed through are surrounded in particular by a polyester non-woven that is provided on the side that is facing the filter element with a hotmelt adhesive layer that is formed in particular by the hotmelt adhesive according to the invention. This hotmelt adhesive layer provides areal bonding of the polyester non-woven with the filter element, wherein also the end faces of the filter bellows are sealed.

In one embodiment, the filter element comprises a main frame and an auxiliary frame wherein the main frame carries an axial seal which seals in the direction of the outflow side and is introduced into a groove of the main frame or into a groove between main frame and lateral surfaces.

The auxiliary frame is advantageously connected in one embodiment with the lateral surfaces by an adhesive connection and has radial surfaces and/or axial surfaces for supporting the filter element in a filter housing.

In one embodiment, on the lateral surfaces of the filter medium that are not flowed through a plastic frame is applied by means of a hotmelt adhesive connection formed in particular by the hotmelt adhesive according to the invention, wherein by means of the hotmelt adhesive also the sealing action of the end face is realized at the end faces.

Openings are provided in the plastic frame on the terminal sides and/or the end faces in one embodiment.

In one embodiment, the plastic frame supports on the inflow side an axial seal which can be brought into engagement with a sealing surface of a filter housing for sealing between raw side and clean side.

In one embodiment, a grip is provided which is connected with the plastic frame and which serves for improved handling of the filter element.

The object is solved further by a method for producing a filter element, the method comprising the steps:
  a. melting a hotmelt adhesive mixture, in particular in an extruder, wherein the hotmelt adhesive mixture comprises
    i. 15-85% by weight of a first hotmelt adhesive that is polyester-based,
    ii. 15-85% by weight of a second hotmelt adhesive that is polyamide-based,
    wherein the weight proportions of the first and the second hotmelt adhesives together constitute 100% by weight of the hotmelt adhesive mixture, wherein the hotmelt adhesive mixture constitutes a proportion of more than 75% by weight of the hotmelt adhesive system, wherein the remainder is made up of fillers such as chalk and/or pigments, such as titanium dioxide as a white pigment, and/or a tack-providing resin and/or at least one further hotmelt adhesive on polycondensate basis,
  b. In particular dynamically mixing the two hotmelt adhesives, in particular by producing shearing forces in the melt, in particular in an extruder, to a hotmelt adhesive mixture;

c. application of the molten hotmelt adhesive mixture onto a web-shaped filter medium in adhesive beads that are in particular regularly or irregularly interrupted, d. folding the filter medium with simultaneous gluing of the folds by the applied hotmelt adhesive mixture.

This has the advantage that a filter element bonded by means of hotmelt adhesive can be produced which, in comparison to other known filter elements glued by means of hotmelt adhesives, has a reduced number of hotmelt adhesive strings.

In one embodiment, the granular materials of the two hotmelt adhesives are mixed before heating and subsequently heated and melted.

In one embodiment of both methods, mixing, heating and melting of the hotmelt adhesives is carried out in an extruder.

This has the advantage that an excellent mixing of the hotmelt adhesives is achieved close to the application site.

In one embodiment the molten hotmelt adhesive system is foamed with a gas, in particular nitrogen, air, $CO_2$, or the like.

In one embodiment, the application of the adhesive is realized directly following the mixing action, in particular for avoiding separation.

In one embodiment of the method, as a final step, in particular without intermediate cooling, a bead-shaped regularly or irregularly interrupted application onto a flat, in particular, fibrous substrate is carried out.

In this context, it is advantageous that the application is realized only a few minutes (in particular 0-5 minutes) after the mixing action in order to keep separation of components as low as possible.

In one embodiment, the application is done by applicator nozzles that are in particular connected to gear pumps.

In one embodiment, the application is done by a wide mouth nozzle which is located within a steel pipe with many bores (size and number dependent on desired adhesive dot pattern) is applied through the steel pipe. With the size of the pipe and the size of the bores, in combination with the conveyed quantity of adhesive, the dot size or the length of the hotmelt adhesive application is determined.

The invention concerns moreover the use of a hotmelt adhesive system according to the invention for string-free bonding of flat substrates, in particular filter media, for example, cellulose media, meltblown filter media, nanofiber media or combinations thereof, in particular by means of regularly or irregularly interrupted hotmelt adhesive beads.

In one embodiment, gluing of the filter elements is realized with a hotmelt adhesive system, the hotmelt adhesive system comprising a hotmelt adhesive mixture, the mixture comprising 15-85% by weight, in particular 30-70% by weight, of a first hotmelt adhesive that is polyester-based, and 15-85% by weight, in particular 30-70% by weight, of a second hotmelt adhesive that is polyamide-based solved. In this context, the sum of the components should be 100% of the hotmelt adhesive mixture and in particular 100% of the hotmelt adhesive system.

This hotmelt adhesive system has surprisingly the advantage that it enables in particular a regularly or irregularly interrupted bead-shaped application of the hotmelt adhesive, in particular by means of applicator nozzles, onto a substrate without, or substantially without, formation of hotmelt adhesive strings.

The mentioned quantities with regard to the first and the second hotmelt adhesive are to be understood such that the first as well as the second hotmelt adhesive can be comprised each of several polyester-based or polyamide-based hotmelt adhesives in particular in order to be able to provide a fine adjustment of material parameters and mechanical properties.

In one embodiment, the hotmelt adhesive mixture constitutes a proportion of more than 75% by weight, preferably more than 85% by weight, particularly preferred more than 95% by weight, in particular 100% by weight, of the hotmelt adhesive system, wherein the remainder is comprised of fillers such as chalk and/or pigments, such as titanium dioxide as a white pigment, and/or a tack-providing resin (aromatic, aliphatic or cycloaliphatic hydrocarbon resins or modified or hydrogenated versions thereof, for example, wood resin (ester) or aliphatic or alicyclic petroleum hydrocarbon resins or their hydrogenated derivatives as, for example, disclosed in WO 2007/057059 A1) and/or paraffin and/or a further hotmelt adhesive on polycondensate basis.

In one embodiment, the hotmelt adhesive system contains between 0-25% by weight additives or fillers that may be selected from the following additives and fillers of the basic hotmelt adhesives, namely of the first polyester-based hotmelt adhesive and the second polyamide-based hotmelt adhesive.

In one embodiment, the polyester-based hotmelt adhesive contains as an additive a carbodiimide, calcium oxide or an anhydride, in particular for improving hydrolysis resistance and/or the adhesive properties, in particular in a weight proportion of 0-5%.

In one embodiment, the polyester-based hotmelt adhesive contains as an additive a wax, in particular paraffin, and/or an oxide wax or a powder-like additive, in particular pyrogenic silica, in particular for accelerating crystallization, in particular in a weight proportion of 0-5%.

In one embodiment, the polyester-based hotmelt adhesive has a density between 1.15 and 1.35 $g/cm^3$, preferably 1.2-1.3 $g/cm^3$, particularly preferred 1.23-1.27 $g/cm^3$.

In one embodiment, the polyamide-based hotmelt adhesive has a density between 0.95 and 1 $g/cm^3$, preferably 0.97-0.99 $g/cm^3$.

in one embodiment, the polyester-based hotmelt adhesive has an elongation at break of >50%, preferably >70%, particularly preferred >90%, in particular measured according to ISO 527.

In one embodiment, the polyester-based hotmelt adhesive has a melting temperature between 150 degrees Celsius and 170 degrees Celsius, preferably between 150 degrees Celsius and 160 degrees Celsius.

In one embodiment, the polyamide-based hotmelt adhesive has a melting temperature between 180 degrees Celsius and 210 degrees Celsius.

In one embodiment, the polyamide-based hotmelt adhesive has a softening temperature smaller than 188 degrees Celsius, preferably smaller than 175 degrees Celsius, particularly preferred smaller than 165 degrees Celsius.

In one embodiment, the polyamide-based hotmelt adhesive has a processing temperature between 180 degrees Celsius and 230 degrees Celsius.

In one embodiment, the polyester-based hotmelt adhesive is formed of a composition of basic materials, the composition comprising a. at least one acid, in particular phthalic acid or isophthalic acid or terephthalic acid or adipic acid or succinic acid or 6-hydroxy caproic acid or a mixture of at least two of these acids, in particular for reducing crystallinity, b. and at least one diol, in particular 1,2-ethanediol or 1,4-butanediol or neopentyl glycol or 1,6-hexanediol or cyclohexane dimethanol or diethylene glycol or a mixture of at least two of these diols, in particular for reducing crystallinity, in particular formed by polycondensation.

In one embodiment, the polyester-based hotmelt adhesive is formed of a composition of basic materials, the composition comprising 30-50% by weight, preferably 30-45% by weight, especially preferred 30-40% by weight, butanediol or ethanediol or a mixture thereof.

In one embodiment, the polyester-based hotmelt adhesive is formed of a composition of basic materials, the composition comprising >20% by weight, preferably >30% by weight, terephthalic acid, in particular for reducing the stringing tendency and/or for increasing the melting point.

In one embodiment, the polyester-based hotmelt adhesive is formed of a composition of basic materials, the composition comprising <65% by weight, preferably <45% by weight, particularly preferred <35% by weight, terephthalic acid, in particular for reducing the stringing tendency.

In one embodiment, the polyester-based hotmelt adhesive is formed of a composition of basic materials, the composition comprising >10% by weight, preferably >20% by weight, especially preferred >25% by weight, adipic acid, in particular for reducing the melting point and/or the stringing tendency.

In one embodiment, the polyester-based hotmelt adhesive is formed of a composition of basic materials, the composition comprising <40% by weight, preferably <30% by weight, adipic acid, in particular for reducing the melting point and/or the stringing tendency.

In one embodiment, the polyamide-based hotmelt adhesive is formed of a composition of basic materials, the composition comprising and <30% by weight, preferably <25% by weight, of sebacic acid, in particular for improving the resistance to thermal distortion and/or for reducing the stringing tendency.

In one embodiment, the polyamide-based hotmelt adhesive is formed of a composition of basic materials, the composition comprising
  a. at least one acid, in particular adipic acid or acelain acid or sebacic acid or dimerized fatty acid or a mixture of at least two of these acids,
  b. and at least one amine, in particular ethylene diamine or hexamethylene diamine or 2,2,4-trimethyl hexamethylene diamine or ε-caprolactam or 1-amino-3-aminomethyl-3,5,5-trimethyl cyclohexane (isophorone diamine) or piperazine or a mixture of at least two of these amines, in particular formed by polycondensation.

In one embodiment, the polyamide-based hotmelt adhesive is formed of a composition of basic materials, the composition comprising 50-90% by weight, preferably 60-80% by weight, particularly preferred 60-70% by weight, ε-caprolactam or hexamethylene diamine or 2,2,4-trimethyl-hexamethylene diamine or a mixture of at least two of these amines.

In one embodiment, the polyamide-based hotmelt adhesive is formed of a composition of basic materials, the composition comprising >5% by weight, preferably >10% by weight, particularly preferred >15% by weight, of adipic acid, in particular for improving the resistance to thermal distortion and/or for reducing the stringing tendency and/or for increasing the elongation at break.

In one embodiment, the polyamide-based hotmelt adhesive is comprised of a composition of basic materials, the composition comprising and <30% by weight, preferably <25% by weight, of adipic acid, in particular for improving the resistance to thermal distortion and/or for reducing the stringing tendency.

In one embodiment, the total proportion of adipic acid in the basic materials of the polyamide-based hotmelt adhesive and of the polyester-based hotmelt adhesive is >5% by weight, preferably >10% by weight, particularly preferred >15% by weight and at the same time <35% by weight, preferably <30% by weight and particularly preferred <25% by weight, in particular for improving the resistance to thermal distortion and/or for reducing the stringing tendency.

In one embodiment, the hotmelt adhesive comprises a hotmelt adhesive mixture, the mixture comprising
  a. between 30 and 70% by weight, preferably 45-55% by weight, of a first polyester-based hotmelt adhesive,
  b. between 30 and 70% by weight, preferably 45-55% by weight, of a second polyamide-based hotmelt adhesive.

BRIEF DESCRIPTION OF THE DRAWINGS

Further advantages, features and details of the invention result from the following description in which embodiments of the invention are explained in more detail with the aid of the drawings. A person of skill in the art will consider the features, disclosed in the drawing, the description and the claims in combination, expediently also individually and combine them to other meaningful combinations. It is shown in:

EMBODIMENT(S) OF THE INVENTION

Figure 1:
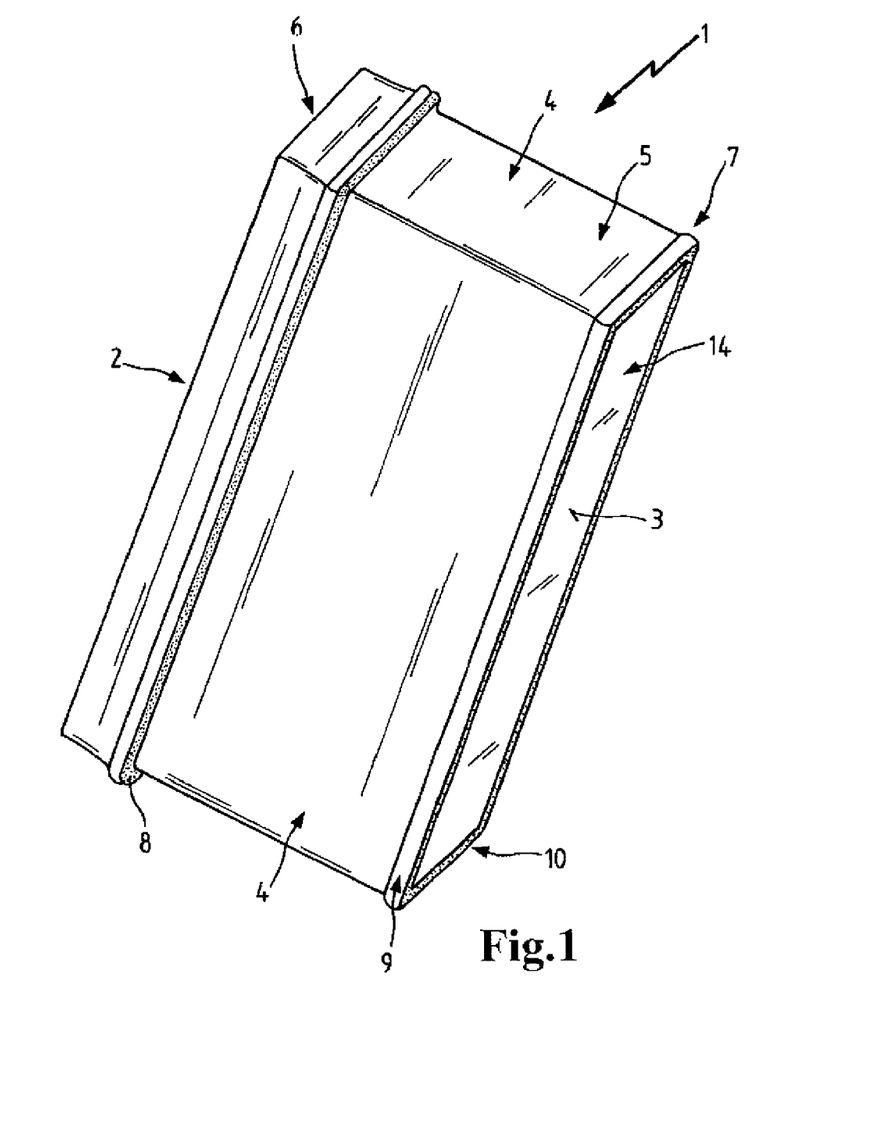
FIG. 1 a view of an embodiment of a filter according to the invention.

FIG. 1 shows a filter element 1 with an inflow side 2 at the raw side and an outflow side 3 at the clean side. The filter element is formed by a filter medium 14 that is folded multiple times, wherein the folds extend between the inflow side and the outflow side, i.e., fold tips are present at the inflow side and at the outflow side, respectively. The lateral surfaces of the filter element 4 that are not flowed through are surrounded in particular by a polyester non-woven which is provided at the side that is facing the filter element with a hotmelt adhesive layer that is formed in particular by the hotmelt adhesive according to the invention. This hotmelt adhesive layer provides an areal adhesive connection of the polyester nonwoven with the filter element, wherein also the end face 5 of the filter bellows is sealed. The filter element 1 comprises a main frame 6 and an auxiliary frame 7 wherein the main frame carries an axial seal 8 which seals in the direction of the outflow side 3 and is introduced into a groove of the main frame or into a groove between main frame and lateral surfaces 4. The auxiliary frame is connected with the lateral surfaces 4 by an adhesive connection and has radial surfaces 9 and axial surfaces 10 for supporting the filter element in the housing, not illustrated.

Figure 2:
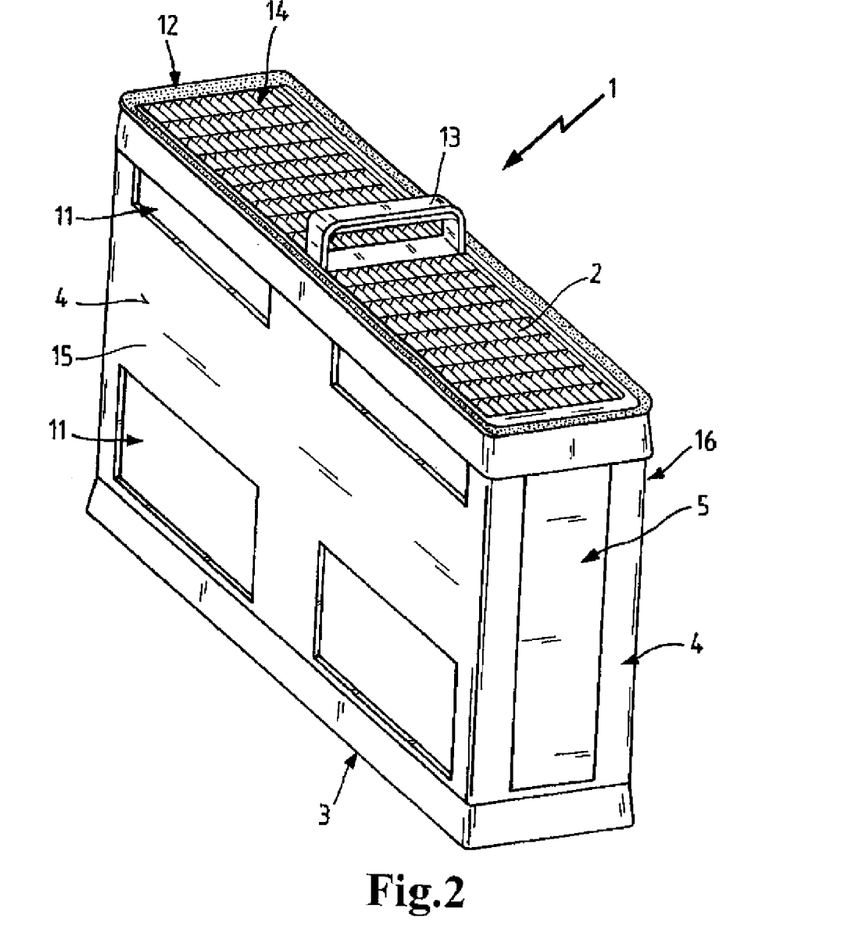
FIG. 2 a view of a further embodiment of a filter according to the invention.

FIG. 2 shows an embodiment of a filter element 1 with an inflow side 2 at the raw side and an outflow side 3 at the clean side. At the lateral surfaces 4 of the filter element 14 that are not flowed through a plastic frame 16 is secured by means of a hotmelt adhesive connection that is formed in particular by the hotmelt adhesive according to the invention, wherein on the end faces 5 by means of the hotmelt adhesive also the sealing action of the end face is realized. At the terminal sides 15 openings 11 are provided in the plastic frame 16. The plastic frame 16 supports at the inflow side 2 an axial seal 12 which can be brought into engagement with a sealing surface of a housing, not illustrated. Moreover, a grip 13 is provided which is connected with the plastic frame 16 and serves for improved handling of the filter element 1.

Figure 3:
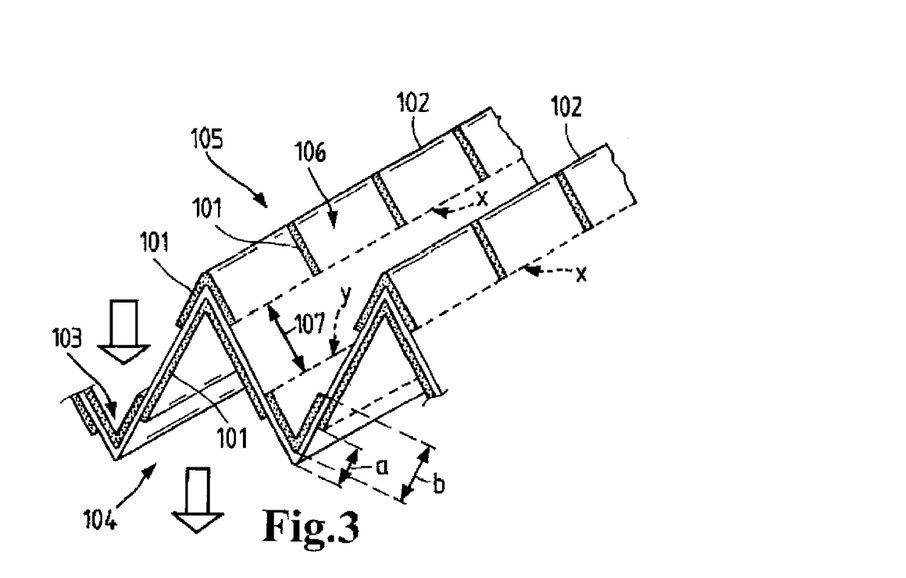
FIG. 3 a detail view of an arrangement of the adhesive beads on a filter according to the invention.

FIG. 3 shows a detail view of an arrangement of the adhesive beads on a filter element according to the invention. In this embodiment, in the folds adhesive beads 101, in particular comprised of the hotmelt adhesive according to the invention, are applied and extend between folds tips 102 and fold bottom 103. Adhesive beads 101 are applied to the clean side 104 as well as the raw side 105. In this context, before erecting the individual folds, at least two, in particular continuous, adhesive beads 101 are applied parallel to each other and perpendicular to the extension of the fold edges 102, 103 onto the filter medium 106. The adhesive beads 101 that are otherwise particularly continuous are in particular interrupted at regular intervals by interruptions 107. On the raw side 105 the adhesive bead is interrupted once between fold tip and fold bottom. The interruption 107 is located in this context centrally between fold tip and fold bottom and corresponds with regard to its length to between one third and one half of the fold height. The interruption 107 begins at a spacing b relative to the fold bottom 103 at the raw side. Accordingly, the folds are adhesively connected at the raw side only in the area of the fold bottom and of the fold tip. At the clean side, an interruption of the adhesive bead across a length a is provided which surrounds the fold tip of the raw side. Accordingly, the folds at the raw side are not glued together in the area of the folds tips.

The spacings a and b relative to the fold bottom at the raw side and the fold tip at the clean side are formed such that the interruptions 107 of the adhesive bead at the clean side and the raw side do not overlap. In this way, it is ensured that an overlap of the adhesive beads 101 at the clean side 104 and at the raw side 105 is formed in the area of the folds tips at the clean side as well as in the vicinity of the fold bottom of the clean side.

The straight lines x and y formed by the beginning and end points of the individual adhesive bead sections extend parallel to the fold edges.

Figure 4:
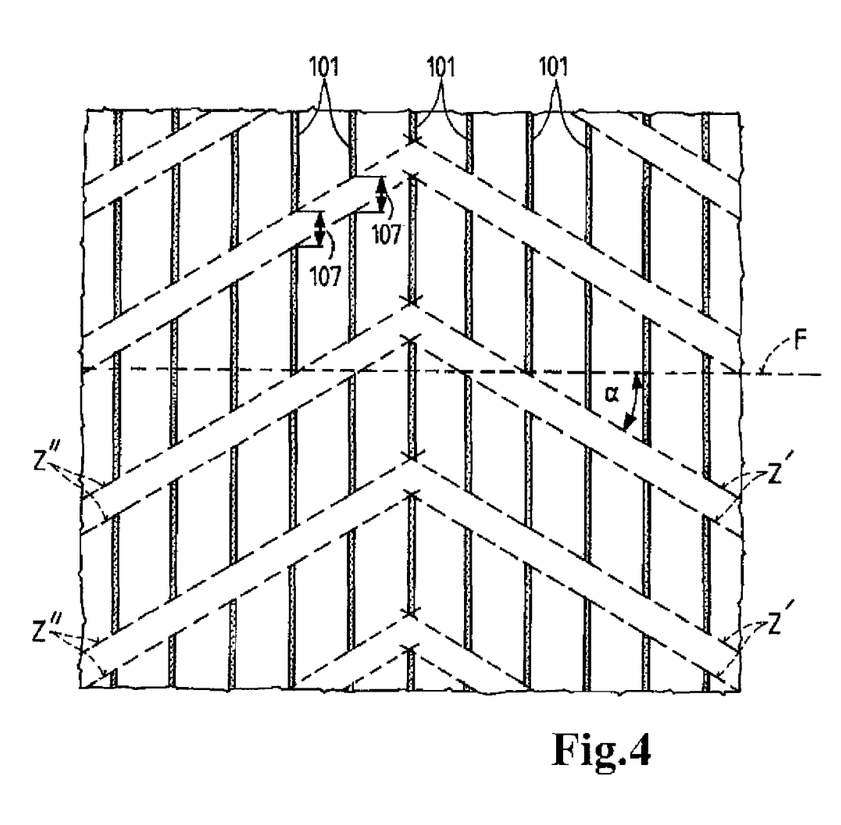
FIG. 4 a detail view of an alternative arrangement of the adhesive beads on a filter according to the invention.

FIG. 4 shows an alternative arrangement of the adhesive beads that are formed in particular by the hotmelt adhesive according to the invention on a filter element according to the invention. In this embodiment, the beginning and end points of the interruptions of the adhesive beads 101 are aligned along a plurality of straight lines z which extend parallel to each other and are positioned relative to the fold edges F at an angle α of 10-80 degrees, preferably 45+/−15 degrees. In this context, the beginning and end points of the interruptions of the adhesive beads extend along at least two sets of straight lines z' and z'', wherein each set of straight lines contains straight lines extending parallel to each other, wherein the corresponding straight lines on the filter medium intercept each other so that an arrow-shaped or zigzag-shaped course of the interruptions 107 of the adhesive bead 1 on the filter medium is formed.

Figure 5:
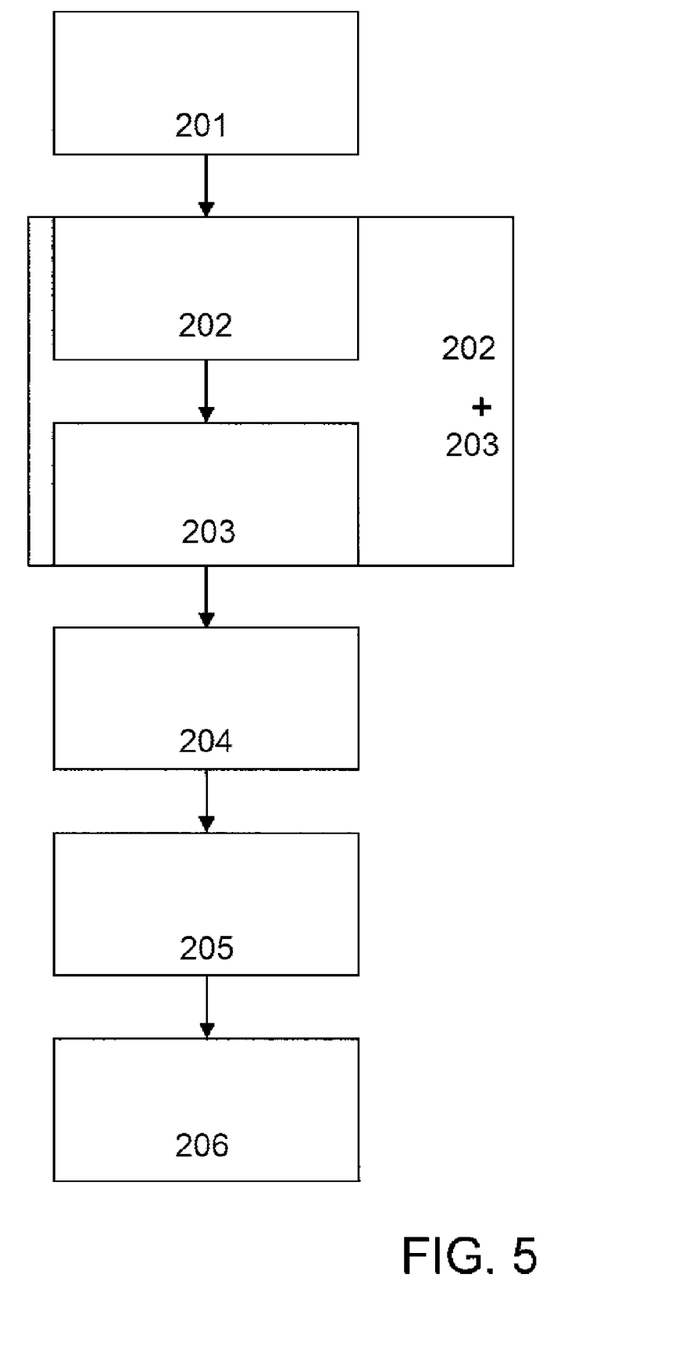
FIG. 5 an embodiment of the sequence of a method according to the invention for producing a filter element.

In FIG. 5, an embodiment of the course of a method according to the invention for producing a hotmelt adhesive system is illustrated.

The method for producing the filter element according to the invention comprises in this embodiment the steps:

(201) mixing granular materials of the two hotmelt adhesives before heating, (202) melting the first hotmelt adhesive that is polyester-based and the second hotmelt adhesive that is polyamide-based, in particular in a composition according to the invention and quantity ratios according to the invention, for example, in a melting device with reservoir, (203) in particular dynamically mixing the two hotmelt adhesives, in particular by producing shearing forces in the melt to a hotmelt adhesive mixture, for example, with a stirring device or a conveying device with worm conveyors or gears, wherein the steps 102 and 103 are however preferably performed simultaneously as step (102+103) in an extruder, (204) optionally foaming the molten hotmelt adhesive system with a gas, in particular nitrogen, air, $CO_2$ or the like, (205) application of the molten hotmelt adhesive mixture onto a web-shaped filter medium in at least one, in particular regularly or irregularly interrupted, adhesive bead, in particular without intermediate cooling, in particular only 0-5 minutes after mixing, (206) folding the filter medium with simultaneous gluing of the folds by the applied hotmelt adhesive mixture.

The following examples illustrate hotmelt adhesive systems employed for a filter element according to the invention or utilized as comparative example.

Example 1

A polyester hotmelt adhesive (Sika SikaMelt 9120) with a density of 1.25 $g/cm^3$ and an elongation at break of in the range of 75-115% and a polyamide hotmelt adhesive (Henkel Macromet 6208) with a density of 0.98 $g/cm^3$ are heated separately with mixing to processing temperature (200 degrees Celsius). The stringing tendency is qualitatively determined in that a round metal rod of 1 mm diameter is immersed in the melt and pulled out suddenly. In Example 1, for both hotmelt adhesives a hotmelt adhesives droplet remains on the round metal rod on which directly after pulling out from the melt there remains a hotmelt adhesive string which cools and hardens. A remaining hardened string is recognizable. The stringing tendency is therefore determined to be high. Moreover, the granular material of the two aforementioned hotmelt adhesives is mixed and the mixed granular material is heated to 200 degrees Celsius and melted jointly. Immediately thereafter, in order to keep separation at a minimum, an application onto a flat filter medium is carried out by means of an applicator nozzle that is coupled directly with a gear pump. When doing so, a surprisingly reduced formation of strings is observed in comparison to the use of the two hotmelt adhesives in separate form. Also, the stringing tendency of the hotmelt adhesive mixture is qualitatively determined in such a way that a round metal rod of 1 mm diameter is immersed into the melt, that has been dynamically mixed again prior to this in a porcelain dish that has been heated to processing temperature, and pulled out suddenly. A hotmelt adhesive droplet remains on the round metal rod into which the string, that has formed directly after pulling out the metal rod from the melt, will pull back. There is no remaining string recognizable. The stringing tendency is therefore determined to be minimal.

Example 2

In the same weight proportions a polyester hotmelt adhesive with a melting point of 150-160 degrees Celsius, substantially formed of 40% by weight butanediol, 33% by weight terephthalic acid, 27% by weight adipic acid, and a polyamide hotmelt adhesive with a melting point at 130 degrees Celsius, formed of 67% by weight of ε-caprolactam, 5% by weight of 2,2,4-trimethyl hexamethylene diamine, 12% by weight of 1-amino-3-aminomethyl-3,5,5-trimethyl cyclohexane and 16% by weight of adipic acid are mixed in granular form and melted jointly with dynamic mixing. The stringing tendency is determined qualitatively such that a round metal rod of 1 mm diameter is immersed into the melt and pulled out suddenly. In Example 2, a hotmelt adhesive droplet remains on the round metal rod into which the string that is formed directly after pulling out the metal rod from the melt pulls back. A remaining string is not recognizable. The stringing tendency is therefore determined to be minimal.

Example 3

The polyester hotmelt adhesive (Sika Sikamelt 9420) with an elongation at break of approximately 50-60% is mixed as in Example 1 in weight proportions of 60:40, 65:35, 70:30 (the polyester hotmelt adhesive is mentioned first in each case) with a polyamide hotmelt adhesive (Henkel Macromet 6208) with a melting temperature between 188 and 195 degrees Celsius and a density of 1.02 g/cm$^3$ and is tested with regard to stringing tendency.

In Example 3 a hotmelt adhesive droplet remains on the round metal rod into which the string, that is formed immediately after pulling out the round metal rod from the melt, pulls back completely or partially, depending on the mixing ratio. The effect is here significantly less pronounced than in the application of the two hotmelt adhesives when used separately.

Example 4

The polyester hotmelt adhesive of Example 2 and a polyamide hotmelt adhesive with a density of 0.97 g/cm$^3$, a softening point of 190-205 degrees Celsius (Henkel Macromet 2035) are mixed in weight ratios of 30:70, 50:50, and 70:30 in analogy to Example 1 and tested. In Example 4, a hotmelt adhesive droplet remains on the round metal rod into which the string, that is formed immediately after pulling out the round metal rod from the melt, will pull back. A remaining string is not recognizable or significantly smaller than in the application of the two hotmelt adhesives when used separately, wherein the stringing tendency increases again beginning at a weight proportion of 70% of the aforementioned polyester adhesive. The stringing tendency is therefore determined to be minimal.

The invention claimed is:

1. A filter element, comprising:
a zigzag-folded filter bellows that is formed from a flat filter medium;
wherein the filter bellows is glued together by at least two regularly or irregularly interrupted, adhesive beads of a hotmelt adhesive system that are extending on the filter medium;
wherein the hotmelt adhesive system comprises a hotmelt adhesive mixture, the hotmelt adhesive mixture consisting of:
15-85% by weight of a first hotmelt adhesive that is polyester-based; and
15-85% by weight of a second hotmelt adhesive that is polyamide-based;
wherein the weight proportions of the first and of the second hotmelt adhesives together constitute 100% by weight of the hotmelt adhesive mixture;
wherein the hotmelt adhesive mixture has a proportion of more than 75% by weight in the hotmelt adhesive system;
wherein a remainder of the hotmelt adhesive system is formed fillers, including one or more of: chalk, titanium dioxide as a white pigment, a tack-providing resin, at least one further hotmelt adhesive on polycondensate basis;
a zigzag-folded filter medium, which separates a raw side from a clean side of the filter element;
wherein the zigzag folds of the filter medium have alternating fold tips and fold bottoms;
wherein hotmelt adhesive beads are arranged in the fold interstices, the fold interstices extending alternatingly between the fold tips and the fold bottoms,
wherein on the raw side as well as on the clean side of the filter medium at least two elongated adhesive beads are arranged extending parallel to each other and perpendicular to a direction of extension of the fold edges;
wherein the adhesive beads on the raw side and/or the clean side are interrupted at regular intervals providing gaps in the respective adhesive bead where adhesive is not present, the intervals having an interval beginning point and end point;
wherein the beginning and end points of the interruptions of the parallel extending adhesive beads are positioned to lie on one or more pre-defined straight lines, the predefined straight lines traversing across a plurality of said adhesive beads and interconnecting end points of said traversed plurality of adhesive beads;
wherein the plurality of straight lines extend parallel to each other and, relative to the fold edges, are positioned at an angle of 10-80 degrees.

2. The filter element according to claim 1, wherein the spacing between two sequential interruptions, i.e., the length of a continuous adhesive bead section, is longer than at least one of the adjoining interruptions.

3. A filter element, comprising:
a zigzag-folded filter bellows that is formed from a flat filter medium;
wherein the filter bellows is glued together by at least two regularly or irregularly interrupted, adhesive beads of a hotmelt adhesive system that are extending on the filter medium;
wherein the hotmelt adhesive system comprises a hotmelt adhesive mixture, the hotmelt adhesive mixture consisting of:
15-85% by weight of a first hotmelt adhesive that is polyester-based; and
15-85% by weight of a second hotmelt adhesive that is polyamide-based;
wherein the weight proportions of the first and of the second hotmelt adhesives together constitute 100% by weight of the hotmelt adhesive mixture;
wherein the hotmelt adhesive mixture has a proportion of more than 75% by weight in the hotmelt adhesive system;
wherein a remainder of the hotmelt adhesive system is formed fillers, including one or more of: chalk, titanium dioxide as a white pigment, a tack-providing resin, at least one further hotmelt adhesive on polycondensate basis;
wherein the adhesive beads have at the clean side an interruption of the adhesive bead which surrounds the fold tip at the clean side.

4. The filter element according to claim 3, wherein
a total proportion of adipic acid in the first hotmelt adhesive that is polyester-based and the second hotmelt adhesive that is polyamide-based is >5% by weight, and at the same time <35% by weight.

5. A filter element, comprising:
a zigzag-folded filter bellows that is formed from a flat filter medium;
wherein the filter bellows is glued together by at least two regularly or irregularly interrupted, adhesive beads of a hotmelt adhesive system that are extending on the filter medium;
wherein the hotmelt adhesive system comprises a hotmelt adhesive mixture, the hotmelt adhesive mixture consisting of:
  15-85% by weight of a first hotmelt adhesive that is polyester-based; and
  15-85% by weight of a second hotmelt adhesive that is polyamide-based;
    wherein the weight proportions of the first and of the second hotmelt adhesives together constitute 100% by weight of the hotmelt adhesive mixture;
wherein the hotmelt adhesive mixture has a proportion of more than 75% by weight in the hotmelt adhesive system;
wherein a remainder of the hotmelt adhesive system is formed fillers, including one or more of: chalk, titanium dioxide as a white pigment, a tack-providing resin, at least one further hotmelt adhesive on polycondensate basis;
wherein the interruptions of the adhesive beads on the raw side and on the clean side do not overlap.

6. The filter element according to claim 5, wherein
at least one of said adhesive beads on the raw side are positioned directly opposite to one or more of said adhesive beads on the clean side.

7. The filter element according to claim 5, wherein
a total proportion of adipic acid in the first hotmelt adhesive that is polyester-based and the second hotmelt adhesive that is polyamide-based is >5% by weight, and at the same time <35% by weight.

8. A filter element, comprising:
a zigzag-folded filter bellows that is formed from a flat filter medium;
wherein the filter bellows is glued together by at least two regularly or irregularly interrupted, adhesive beads of a hotmelt adhesive system that are extending on the filter medium;
wherein the hotmelt adhesive system comprises a hotmelt adhesive mixture, the hotmelt adhesive mixture consisting of:
  15-85% by weight of a first hotmelt adhesive that is polyester-based; and
  15-85% by weight of a second hotmelt adhesive that is polyamide-based;
    wherein the weight proportions of the first and of the second hotmelt adhesives together constitute 100% by weight of the hotmelt adhesive mixture;
wherein the hotmelt adhesive mixture has a proportion of more than 75% by weight in the hotmelt adhesive system;
wherein a remainder of the hotmelt adhesive system is formed fillers, including one or more of: chalk, titanium dioxide as a white pigment, a tack-providing resin, at least one further hotmelt adhesive on polycondensate basis;
a zigzag-folded filter medium, which separates a raw side from a clean side of the filter element;
wherein the zigzag folds of the filter medium have alternating fold tips and fold bottoms;
wherein hotmelt adhesive beads are arranged in the fold interstices, the fold interstices extending alternatingly between the fold tips and the fold bottoms,
wherein on the raw side as well as on the clean side of the filter medium at least two elongated adhesive beads are arranged extending extending parallel to each other and perpendicular to a direction of extension of the fold edges;
wherein the adhesive beads on the raw side and/or the clean side are interrupted at regular intervals providing gaps in the respective adhesive bead where adhesive is not present, the intervals having an interval beginning point and end point;
wherein the beginning and end points of the interruptions of the parallel extending adhesive beads are positioned to lie on one or more pre-defined straight lines, the predefined straight lines traversing across a plurality of said adhesive beads and interconnecting end points of said traversed plurality of adhesive beads;
wherein the beginning and end points of the interruptions of the adhesive beads extends along and lie on at least two sets of straight lines, wherein each set of straight lines comprises straight lines parallel to each other, wherein the corresponding straight lines on the filter medium intersect so that an arrow-shaped or zigzag-shaped course of the interruptions of the adhesive beads is formed on the filter medium.

9. A filter element, comprising:
a zigzag-folded filter bellows that is formed from a flat filter medium;
wherein the filter bellows is glued together by at least two regularly or irregularly interrupted, adhesive beads of a hotmelt adhesive system that are extending on the filter medium;
wherein the hotmelt adhesive system comprises a hotmelt adhesive mixture, the hotmelt adhesive mixture consisting of:
  15-85% by weight of a first hotmelt adhesive that is polyester-based; and
  15-85% by weight of a second hotmelt adhesive that is polyamide-based;
    wherein the weight proportions of the first and of the second hotmelt adhesives together constitute 100% by weight of the hotmelt adhesive mixture;
wherein the hotmelt adhesive mixture has a proportion of more than 75% by weight in the hotmelt adhesive system;
wherein a remainder of the hotmelt adhesive system is formed fillers, including one or more of: chalk, titanium dioxide as a white pigment, a tack-providing resin, at least one further hotmelt adhesive on polycondensate basis;
wherein the filter element comprises a zigzag-folded filter medium, which separates a raw side from a clean side of the filter element;
wherein the zigzag folds of the filter medium have alternating fold tips and fold bottoms;
wherein hotmelt adhesive beads are arranged in the fold interstices, the fold interstices extending alternatingly between the fold tips and the fold bottoms,
wherein on the raw side as well as on the clean side of the filter medium at least two elongated adhesive beads are arranged extending parallel to each other and perpendicular to a direction of extension of the fold edges;

wherein the adhesive beads on the raw side and/or the clean side are interrupted at regular intervals providing gaps in the respective adhesive bead where adhesive is not present, the intervals having an interval beginning point and end point;

wherein the beginning and end points of the interruptions of the parallel extending adhesive beads are positioned to lie on one or more pre-defined curved lines, the pre-defined curved lines traversing across a plurality of said adhesive beads and interconnecting end points of said traversed plurality of adhesive beads;

wherein the pre-defined curved lines have the same shape but are displaced relative to each other in a direction substantially perpendicular (+/−30 degrees) to the fold edges.

10. The filter element according to claim 9, wherein the pre-define curved lines comprise any of: circle sections ellipsis sections, sine shapes or other regular periodic wave forms.

\* \* \* \* \*